UNITED STATES PATENT OFFICE 2,527,265

THIAZOLIDONE COMPOUNDS

John David Kendall and George Frank Duffin, Ilford, England, assignors to Ilford Limited, Ilford, England, a British company No Drawing. Application November 9, 1948, Serial No. 59,180. In Great Britain November 10, 1947

8 Claims. (Cl. 260—250)

This invention relates to the production of organic compounds which contain a thiazolidone ring and which are useful dyestuff intermediates.

By reacting a compound of the general formula I:

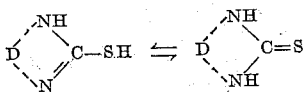

where D is the residue of a five-membered or six-membered heterocyclic ring system, with chloracetic acid in alkaline solution, there is obtained a compound of the general formula II:

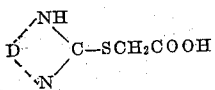

i. e. a thioglycollic acid derivative. These compounds are quite stable and are not particularly reactive.

According to the present invention compounds of general formula II or the corresponding esters are subjected to heating, in the case of the free acid preferably in the presence of a dehydrating solvent such as an acid anhydride, and in the case of the ester preferably at or above the fusion temperature of the compound, whereby ring-closure is effected to form a compound of the general formula III:

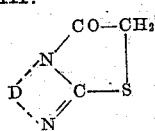

The residue D is preferably a chain of 2 or 3 atoms selected from carbon or nitrogen. All may be carbon atoms or one or two of them may be nitrogen. Thus D may be, for example, the residue of an iminazolyl, dihydroiminazolyl, benziminazolyl, thiouracil, triazole, thiohydantoin or thiotriazolone nucleus.

The following examples, in which the parts are by weight, serve to illustrate the invention but are not to be regarded as limiting it in any way.

EXAMPLE 1

PREPARATION OF 2:3 (BENZIMINAZO-1'.2'-)-THIAZOLIDONE-4

(a) Preparation of S-benziminazoyl (2) thioglycollic acid

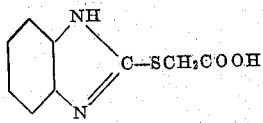

15 parts of 2-mercapto benziminazole were dissolved in 40 parts of 10% aqueous sodium hydroxide solution and 9.5 parts of chloracetic acid in 40 parts of 10% aqueous sodium hydroxide added to it. The solution was heated on the water-bath for one hour, filtered hot, and acidified with 10 parts of concentrated hydrochloric acid. The product was filtered, and washed with water. M. Pt. 198° C. (d) after recrystallisation from aqueous ethyl alcohol.

(b) Preparation of 2:3-(benziminazo-1'.2'-)-thiazolidone-4

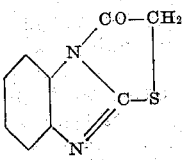

2 parts of S-benziminazolyl-(2) thioglycollic acid, thus prepared, were dissolved in 10 parts of pyridine and 1 part of acetic anhydride added. The mixture was heated on a water-bath for 10 minutes and then poured into 100 parts of water. The oil which was precipitated crystallised on cooling and was recrystallised from ethyl alcohol. M. Pt. 179–181° C.

EXAMPLE 2

PREPARATION OF S-[6-KETO 4-METHYL DIHYDROPYRIMIDYL(2)] THIOGLYCOLLIC ACID AND RING-CLOSURE OF THE PRODUCT

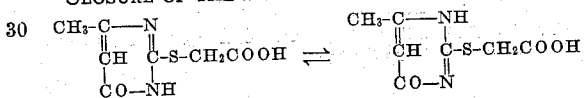

14.2 parts of methyl thiouracil were dissolved in 40 parts of 10% aqueous sodium hydroxide and 9.5 parts of chloracetic acid in 40 parts of 10% aqueous sodium hydroxide added to it. The solution was heated on the water-bath for half an hour, and acidified hot with 10 parts of concentrated hydrochloric acid. On cooling, the product crystallised out. M. Pt. 204° C.

This product, on heating with acetic anhydride as in Example 1, was converted to the corresponding thiazolone compound.

EXAMPLE 3

PREPARATION OF S-[4-KETO DIHYDROQUINAZOLYL-(2)]-THIOGLYCOLLIC ACID AND RING-CLOSURE OF THE PRODUCT

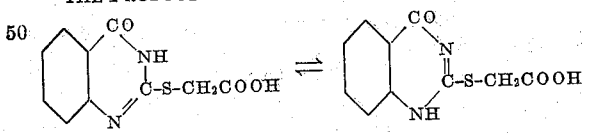

8.9 parts of 2-thio 4-keto tetrahydroquinazoline were dissolved in 20 parts of 10% aqueous sodium hydroxide and 4.7 parts of monochloracetic acid in 20 parts of 10% aqueous sodium hydroxide were added to it. The solution was warmed on the water-bath for ¾ of an hour and then neutralised with 5 parts of concentrated hydrochloric acid. The precipitated product was filtered, washed well with water and dried. M. Pt. 223° C.

This product, on heating with acetic anhydride as in Example 1, was converted to the corresponding thiazolone compound.

EXAMPLE 4

PREPARATION OF 5-METHYL 1:3:4-TRIAZOLE 2-THIOGLYCOLLIC ACID AND RING-CLOSURE OF THE PRODUCT 5-methyl 2-mercapto 1:3:4-triazole (2.2 parts by weight) was dissolved in 10% aqueous sodium hydroxide (7.6 parts by volume) and a solution of chloroacetic acid (1.82 parts by weight) in 10% aqueous sodium hydroxide (7.6 parts by volume) was added. The mixture was heated for two hours at 100°, filtered hot, cooled and neutralised with concentrated hydrochloric acid (1.9 parts by volume). The product was precipitated as small white needles and was recrystallised from water giving 2.95 parts by weight, M. Pt. 226°.

This product, on heating with acetic anhydride as in Example 1, was converted to the corresponding thiazolone compound.

Whilst in the foregoing examples acetic anhydride has been used as the dehydrating solvent, it will be understood that other dehydrating solvents can also be employed, though the fatty acid anhydrides, e. g. propionic anhydride or butyric anhydride are the preferred alternatives.

The products of this invention may be converted into dyestuffs, for example by the methods described in our co-pending application Serial No. 59,181, filed November 9, 1948, corresponding to British application No. 29,922/47, and where intended for such use frequently need not be isolated from the reaction mixture in which they are formed. As indicated in the said application Serial No. 59,181 ring-closure and dyestuff-formation may be effected as a single operation.

What we claim is:

1. Process for the production of compounds of the general formula:

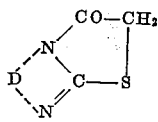

where D is a chain of more than one and less than four atoms all of which are selected from the group consisting of carbon and nitrogen and at least one of which is carbon which comprises subjecting to heating a compound of the general formula:

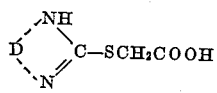

where D has the same significance as in the first formula.

2. Process for the production of compounds of the general formula:

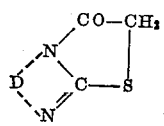

where D is a chain of more than one and less than 4 atoms all of which are selected from the group consisting of carbon and nitrogen and at least one of which is carbon, which comprises subjecting to heating a compound of the general formula:

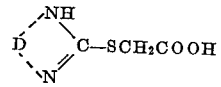

where D has the same significance as in the first formula in the presence of a monocarboxylic acid anhydride.

3. Process for the production of the compound of the formula:

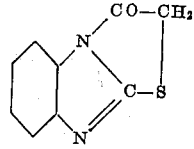

which comprises subjecting to heating a compound of the formula:

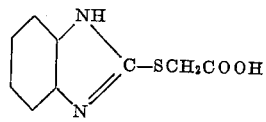

in the presence of a monocarboxylic acid anhydride.

4. Process for the production of a compound of the formula:

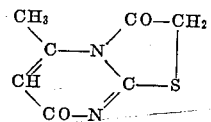

which comprises subjecting to heating a compound of the general formula:

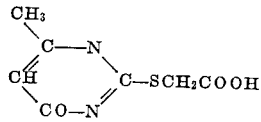

in the presence of a monocarboxylic acid anhydride.

5. Process for the production of compounds of the general formula:

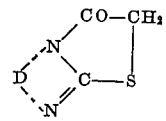

where D is a chain of more than one and less than 4 atoms all of which are selected from the group consisting of carbon and nitrogen and at least one of which is carbon, which comprises subjecting to heating a compound of the general formula:

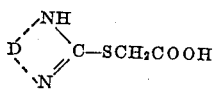

where D has the same significance as in the first formula in the presence of acetic anhydride.

6. A compound of the general formula:

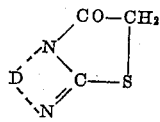

where D is a chain of more than one and less than 4 atoms all of which are selected from the group consisting of carbon and nitrogen and at least one of which is carbon.

7. A compound of the general formula:
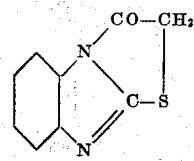
8. A compound of the general formula:
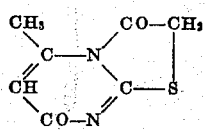
JOHN DAVID KENDALL.
GEORGE FRANK DUFFIN.
REFERENCES CITED
The following references are of record in the file of this patent:
FOREIGN PATENTS
| Number | Country | Date |
|---|---|---|
| 7,575 | Great Britain | 1908 |